Feb. 26, 1952    H. W. HONEYMAN, JR., ET AL    2,586,822
METHOD AND APPARATUS FOR FORMING LADDER
WEB SLAT SUPPORTS FOR VENETIAN BLINDS
Filed Jan. 7, 1949                                                 4 Sheets-Sheet 3
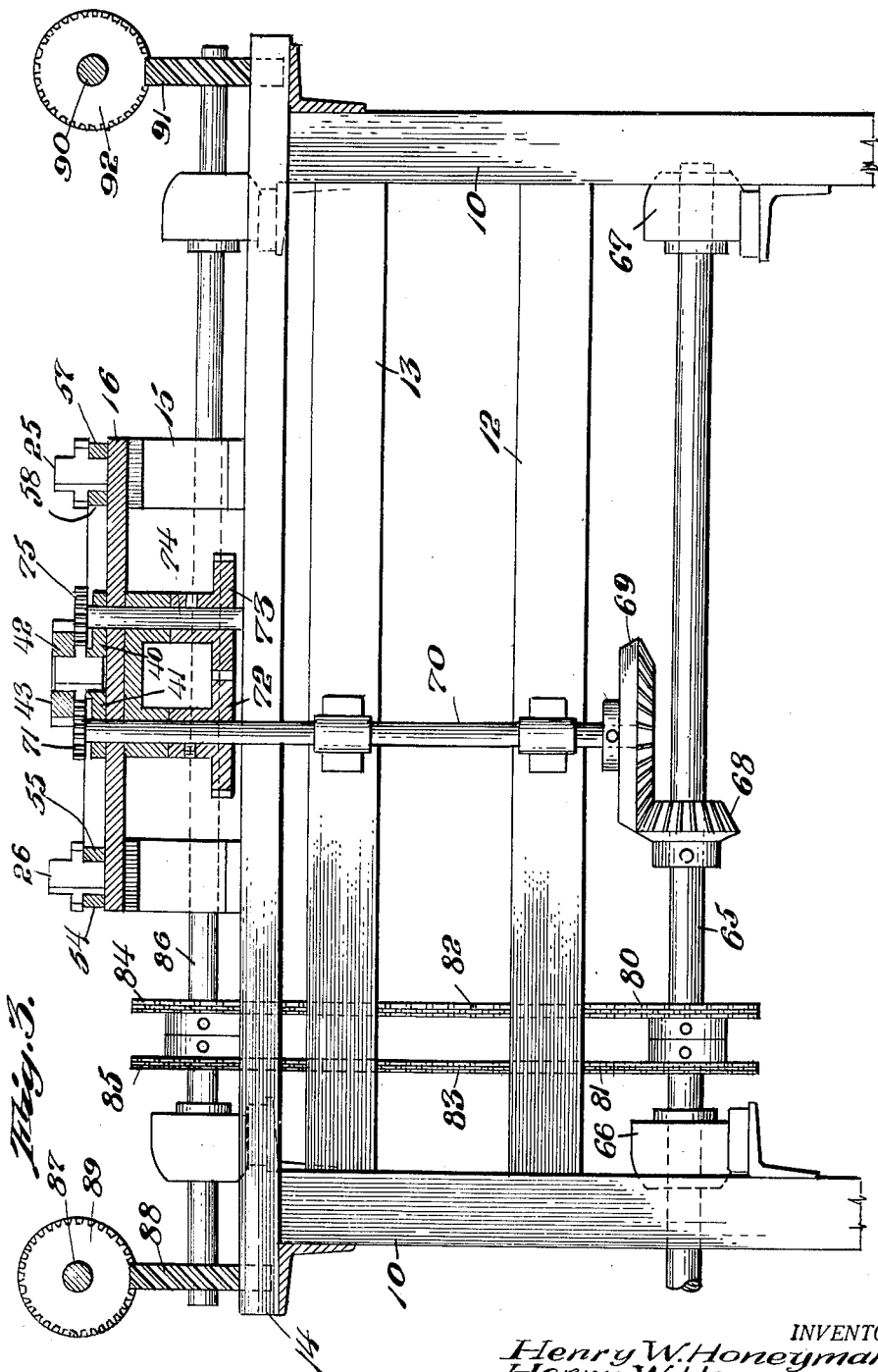
INVENTORS.
Henry W. Honeyman, Jr.
Henry W. Honeyman, 3rd.
BY
Barlow & Barlow
ATTORNEYS.

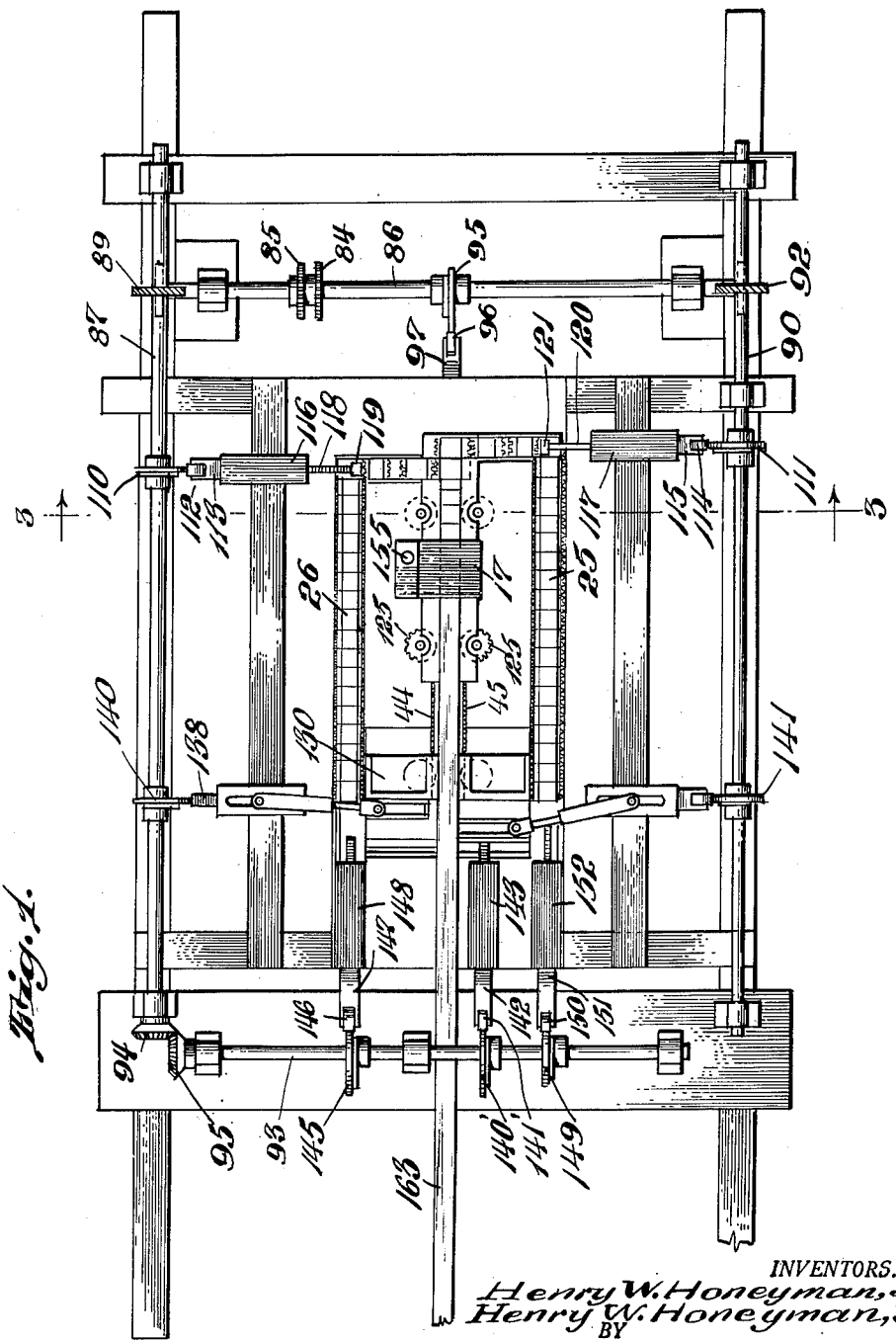

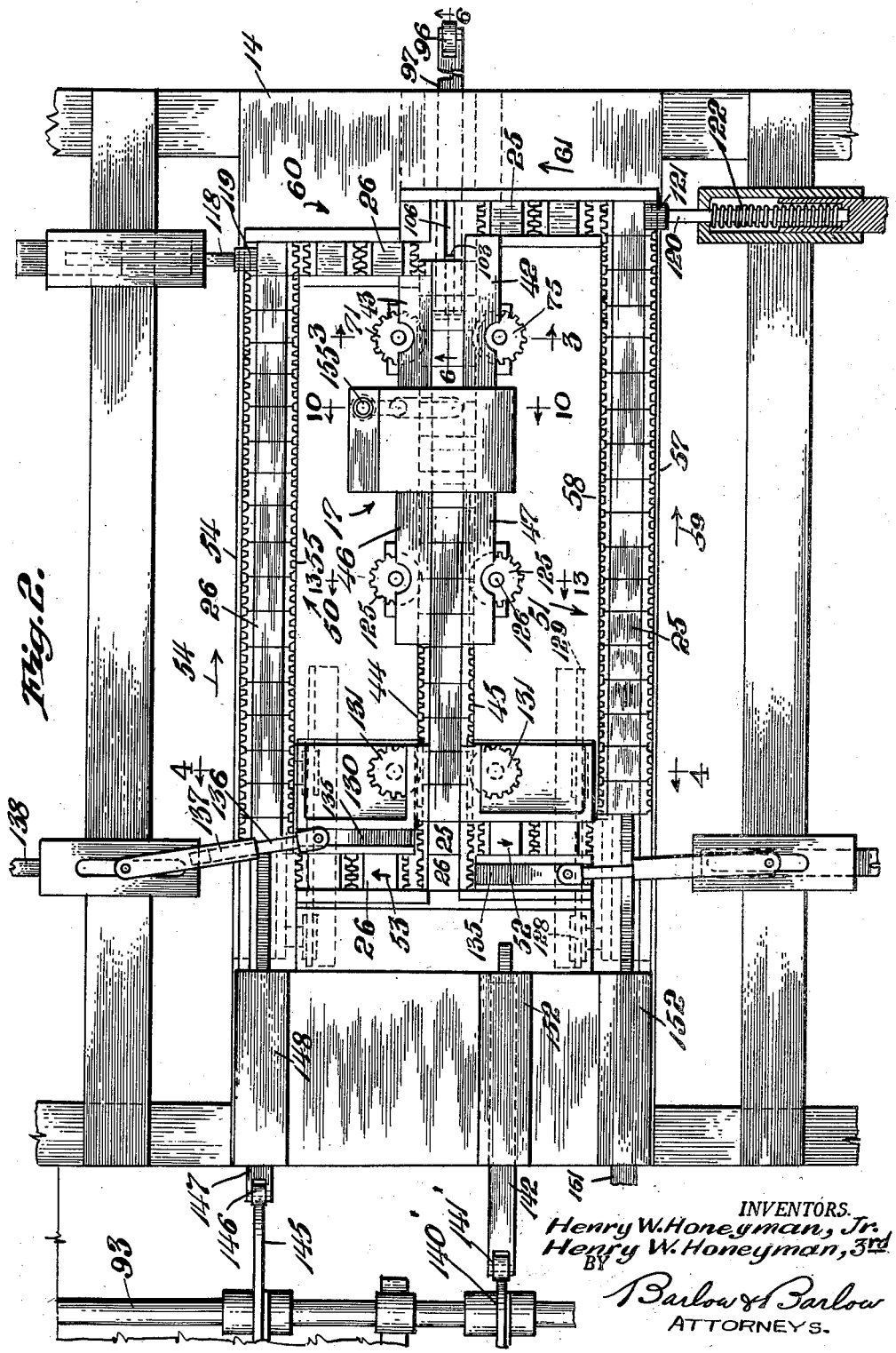

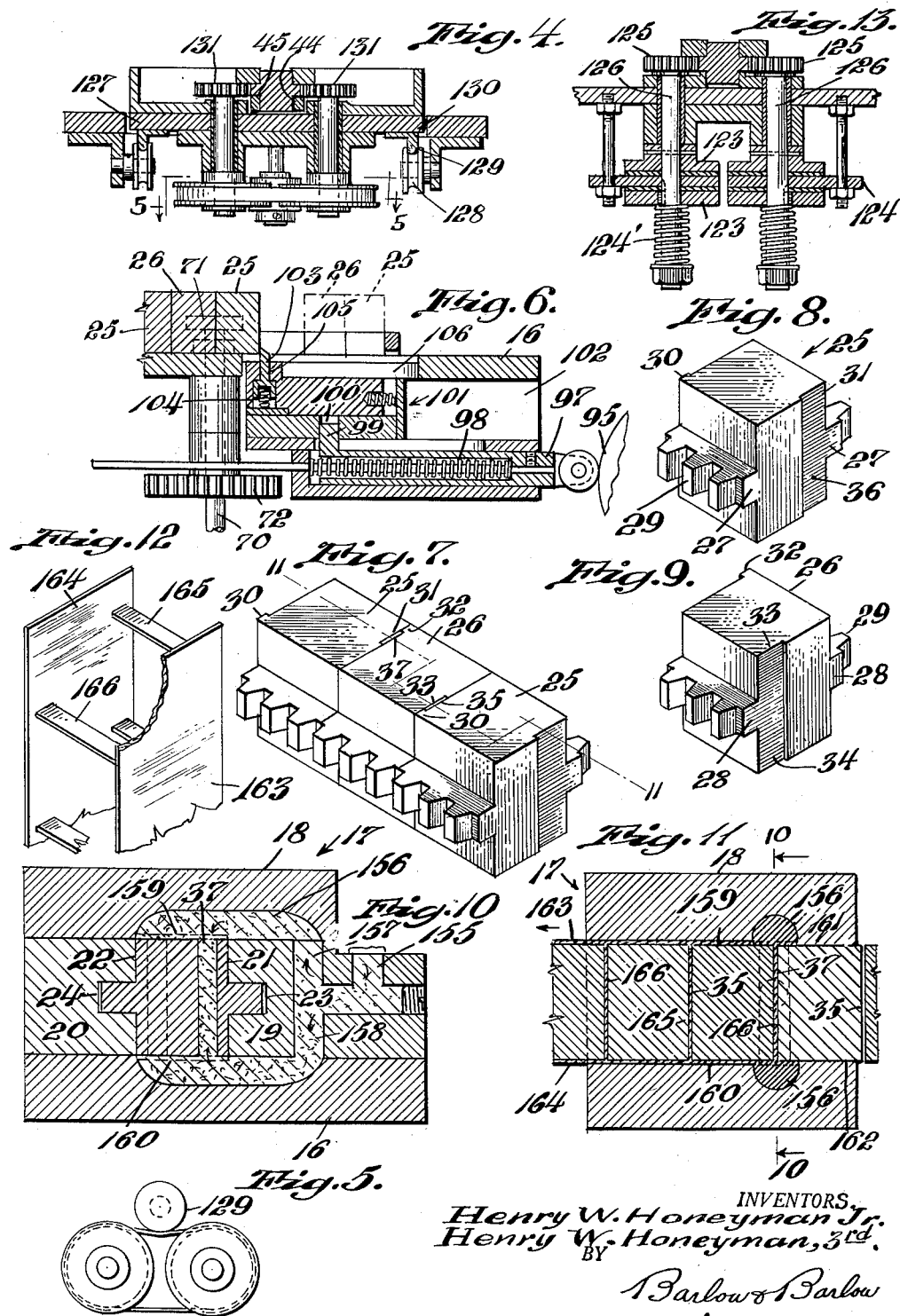

Patented Feb. 26, 1952

2,586,822

UNITED STATES PATENT OFFICE 2,586,822

METHOD AND APPARATUS FOR FORMING LADDER WEB SLAT SUPPORTS FOR VENETIAN BLINDS

Henry W. Honeyman, Jr., and Henry W. Honeyman, 3rd, Riverside, R. I.

Application January 7, 1949, Serial No. 69,688

9 Claims. (Cl. 18—5)

1

This invention relates to the formation of a ladder web or support for the slats of a Venetian blind, more particularly to a machine for forming such a construction by molding.

So-called ladder webs or supports for the slats of a Venetian blind have been formed heretofore by weaving on a relatively complicated loom wherein the cross straps are woven into the webs as a means of attaching these cross straps between the webs. Various attempts have been made at variations of the woven product and some attempt has been made at securing cross straps by sewing, cementing or welding the cross straps to the webs especially if substitute materials have been used. These machines have encountered considerable difficulty, and no machine up to the present time is known of, which will satisfactorily perform the operation on a large commercial scale.

One of the objects of this invention is to provide a machine which will mold ladder web material in a continuous operation so that as the machine runs the ladder web will be delivered therefrom, as long as the supply of resin material is fed to the machine thus forming a ladder web of an indefinite length.

Another object of this invention is to provide a machine in which either the resin material may be formed as on homogenous piece of material or there may be inserted into the webs of the ladder reenforcing fibers.

Another object of this invention is to provide a machine in which there will be a plurality of units which, when brought together and passed through a chamber of a particular shape, will form the desired cavities for the molded structure.

Another object of this invention is to provide for the molding of the desired structure while parts of the mold are continuously moving so that there is a continual delivery of the finished product from the machine.

Another object of this invention is to provide for the proper support and movement of the continually feeding units so that they will repeat in a cycle of operation.

Another object of this invention is to provide a means by which the circulating units may be forced tightly into engagement one with the other at the time of molding.

With these and other objects in view, the invention consists of certain novel features of construction, as will be more fully described and particularly pointed out in the appended claims.

In the accompanying drawings:

Figure 1 is a top plan view of the apparatus or machine which is the subject of this invention with the conduit and structure for supporting

2 the resin material to be used in the molding operation omitted;

Figure 2 is a view similar to Figure 1 but on a larger scale and with some of the parts at the ends of the structure omitted;

Figure 3 is a sectional view taken on line 3—3 of Figure 1 or 2 with parts omitted to better show the driving mechanism for certain parts;

Figure 4 is a sectional view of a portion of the machine taken on line 4—4 of Figure 2;

Figure 5 is a sectional view on line 5—5 of Figure 4;

Figure 6 is a sectional view on line 6—6 of Figure 2;

Figure 7 is a perspective view of a plurality of the circulating block units which form a part of the mold;

Figure 8 is a perspective view of one of the block units;

Figure 9 is a perspective view of another of the block units;

Figure 10 is a sectional view on line 10—10 of Figure 2 or on line 10—10 of Figure 11;

Figure 11 is a sectional view through the mold taken as if along line 11—11 of the mold part in Figure 7;

Figure 12 is a perspective view of a fragment of the finished article which is molded; and Figure 13 is a sectional view on line 13—13 of Figure 2.

In proceeding with this invention, I provide a molding chamber through which blocks are passed which have recesses so that when in the chamber and a plastic material is forced into the chamber and about the blocks, the desired finished article will be formed. The blocks are arranged to pass through the chamber in end-to-end tandem relation and then as there are two different forms of blocks, one form is circulated in one orbit, while the other set is circulated in another orbit back to the starting point where the blocks are again assembled in tandem relation in the proper sequence. The portion of each orbit where the blocks form in tandem relation is common to the orbits of both forms of blocks. These blocks are supported so that they are spaced from the bottom of the chamber and thus molding may occur both below and above the blocks and through the junction of the blocks by recesses formed at the end of the blocks. A drive is provided which engages the blocks and forces them firmly into engagement with each other as the molding takes place. The molding material travels along with the blocks until the blocks are separated from the material, and then the material continues to be delivered in its finished form.

With reference to the drawings and particularly

Figure 3, I have provided a supporting framework consisting of uprights 10, joined together by cross pieces 12 and 13 throughout an extended length sufficient so that the desired skeleton structure or table support is provided. A table 14 is supported on this framework for the positioning of the various operating parts. Upon this table 14, there is supported by means of standards 15, a deck 16 upon which there is mounted a molding chamber 17 (see Figs. 1, 2, and 10).

This molding chamber 17 has as its bottom wall the deck 16 and is provided with a top wall 18 (Fig. 10) and side walls 19 and 20, which side walls present guiding faces 21 and 22 for the blocks shown in Figures 7, 8 and 9. These walls are recessed as at 23 and 24 for the further supporting and guiding of these blocks.

The blocks consist of units 25, as shown in Figure 8, and 26, as shown in Figure 9, which have flanges 27 and 28 extending laterally from the middle of the blocks. These flanges are formed with rack teeth 29 so as to be driven by gears. The flanges enter recesses 23 and 24 and ride upon the lower surface thereof which serve to guide and support the blocks as they are advanced through the mold. The block 25 has a projecting portion 30 on one end face and a recess portion 31 on the other end face, while the block 26 has a projecting portion 32 on one end face and a recess portion 33 on the other end face. When the blocks 25 and 26 engage end face to end face the projecting portion 30 of the block 25 engages the surface 34 of the recess 33 of block 26 and there is left an opening 35 extending vertically through the blocks between the juncture of the blocks 25 and 26; while when the projection 32 of the block 26 engages the surface 36 of the recess 31 of block 25 there is provided an opening 37 extending vertically through the blocks between the juncture of these two blocks. These two recesses are staggered with reference to the center line between the blocks when in tandem relation, as shown in Figure 7.

In order to guide the blocks in tandem relation to the chamber 17, I have provided spaced bars 40 and 41 (Fig. 3) for engaging the opposite sides of the lower part of the block and upon which the flanges 27 and 28 of the blocks may rest and support the block, while bars 42 and 43 are spaced from the bars 40 and 41 and serve to engage and guide the upper portion of the blocks and direct them to the chamber 17. In leaving the chamber a similar arrangement is provided for the blocks where they are guided between and supported on the bars 44 and 45, as shown in Figure 2; while upper bars 46 and 47 extending from the chamber and vertically spaced from the bars 44 and 45 serve to engage and guide the upper parts of the blocks.

An orbit designated generally 50 is provided for the circulation of the blocks 25 by suitably guiding the blocks in their movement, and an orbit 51 is provided for suitably guiding the blocks 26 in their movement. The blocks 25 after they extend through the guideways 44 and 45 are moved in the direction of the arrow 52 by a pusher mechanism, to be later described; while the blocks 26 are moved in the direction of the arrow 53 by an oppositely acting pusher mechanism, also to be later described. The blocks 25 are then moved between guides 54 and 55 (see Figure 3) in their movement in the direction of the arrow 54 (see Figure 2), while the blocks 26 are moved between guides 57 and 58 in the direction of the arrow 59 (see Figure 2). After passing through these guideways forming a part of each of the orbits, the blocks 25 are then moved inwardly by a pusher in the direction of arrow 60, while the blocks 26 are moved inwardly in the direction of the arrow 61, as seen in Figure 2, to again pass through the guideway between bars 40, 41 (Fig. 3) which is common to both of the orbits in tandem relation for passage through the molding chamber 17.

In order that these blocks may be circulated as above indicated, I have provided a main drive shaft 65, as shown in Figure 3, which receives its power from some suitable source either from a belt or from an electric motor and which serves to drive the entire apparatus. The shaft is mounted in suitable bearings 66 and 67 supported on the framework 10 and has a bevel gear 68 which meshes with bevel gear 69 on shaft 70 to transmit power to the pinion gear 71 at the upper end of shaft 70, while the gear 72 fixed on shaft 70 transmits motion to the gear 73 on shaft 74 which in turn drives the pinion 75. The pinions 71 and 75 engage the opposite racks 27 and 28 of the blocks to drive them forward through their guides 40, 41 and 42, 43 in the machine. Power is taken off of the shaft 65 by a pair of sprockets 80 and 81 by means of sprocket chains 82 and 83 which drive the sprocket gears 84 and 85 on cross shaft 86 as shown clearly in Figure 3 (see also Figure 1). These two sprockets and chains are so set as to prevent a back lash in the shaft 86, otherwise one sprocket would be suitable. The cross shaft 86 serves to drive the cam shaft 87 through spiral gears 88 and 89 at one end, while at the other end it drives the cam shaft 90 through spiral gears 91 and 92. The shaft 87 transmits motion to the second cross shaft 93 at the delivery end of the machine through bevel gears 94 and 95.

The cross shaft 86 (Fig. 1) has a cam 95 mounted upon it substantially centrally of the length of the shaft which engages the cam follower 96 mounted upon the slide 97 (see also Fig. 6), which slide is urged toward the cam by spring 98 and which has a projection 99 extending into the slot 100 of the carriage designated generally 101 so that the carriage moves forwardly by the action of the cam 95 and is returned by the spring 98. This carriage 101 slides in the guideway 102 and carries a finger 103 which is forced upwardly by a spring 104 through the opening 105 in a protuberance on the carriage which is guided in a slot 106 in the deck 16. As this carriage is moved by its spring 98 beneath the blocks, the finger 103 is moved downwardly so as to pass beneath the block, while after the carriage has moved to the end of its stroke toward the cam, the finger 103 then springs upwardly so that upon movement by the cam, the finger 103 engages a block 25, as shown in Figure 6, and moves the block forwardly along its guideway.

In order to feed the blocks into the guideway ahead of the chamber from either of the orbits, I have provided a cam 110 on the shaft 87 and 111 on the shaft 90. Cam 110 engages the follower 112 on slide 113, while the cam 111 engages the follower 114 on the slide 115. These slides 113 and 115 are guided as at 116 and 117 so that their rods 118 with end 119, and 120 with end 121 will engage the proper block to move the same from the outside guideways of their orbits to the common guideway of the orbits. The cams have a throw substantially the width of one of the blocks and are so timed as to provide the movement of the blocks into position as desired for providing movement through the molding chamber while a spring such as 122 (see Fig.

2) serves to move the slide 118 or 120, outwardly of the machine.

In order to retard the movement of the blocks through the machine so that their faces may snugly engage, I have provided gears 125—125 mounted at the upper ends of shafts 126 which at their lower ends are provided with fiber faced disks 123 and 123' (Fig. 13) between which is a plate 124 held against rotation, there being springs 124' to urge the disks against the plate, the tension being adjustable by the nuts at the end of shaft 126.

As the blocks pass the gears 125, they are then relieved of the pressure tending to hold them together and are then merely forced forwardly by other blocks pushing them. The blocks are then fed onto the floor 127 of a carriage 130 (see Fig. 4) which carries gears 131 to engage the racks on the blocks. As the blocks are fed forwardly and engage these gears, they serve to move the carriage along the rollers 128 with which the rails 129 of the carriage engage so as to relieve pressure on the forward movement of the blocks and at this time pushers 135 which are connected by links 136 and 137, which telescope one within the other, are actuated by the slides 138 and cams 140 and 141 on the shafts 87 and 90 so as to slide a pair of blocks 25 and 26 from the carriage in the direction of arrows 52 and 53 over to a position in the guideways either 54 and 55 or 57 and 58. The cam 140' (see Fig. 1) having follower 141' and slide 142 acting through guide 143 serves to return the carriage 130 after it discharges the blocks so as to pick up another pair of blocks and at the same time the blocks 25 and 26 are actuated along the outside track of each of their orbits by cams 145 with follower 146, slide 147 and guide 148, and cam 149, follower 150, slide 151 and guide 152 so as to move the blocks 26 along the outside path of each of their orbits.

As the blocks are traveling through the machine, a resin material such as vinyl chloride is injected into the chamber 17 through an opening such as 155 (as shown in Figures 1, 2, or 10). This resin-like material is forced through this opening 155 from a hopper under pressure up to several tons and in a heated condition and into the interior of the chamber 156 as shown in Figure 10 through the passages 157 and 158 so as to fill the space 159 above the blocks and 160 below the blocks, while other material passes through the recesses 35 and 37 between the blocks —all as the blocks are moving forwardly. As the blocks fit closely as at 161 and 162 (see Figure 11) the material will not be extruded rearwardly as the blocks move inwardly but will rather be extruded into the more relieved space 159 and 160 above and below the blocks on the delivery side of the chamber 17. Thus, as the blocks emerge from the chamber, there will be provided the web material 163 and the web material 164 (see Figs. 11 and 12) with the cross straps 165 and 166 between and in staggered relation, these cross straps being formed at the juncture of the blocks to permit of the blocks being moved laterally from either side and from between the webs and permit of the web material being delivered from the machine in a continuous strip of indefinite length.

When it is desired to reinforce the resin material with fibers of some length, these fibers will be mixed in with the resin material to be forced with the resin material through the entrance opening 155 into the mold chamber.

We claim:

1. A machine for molding Venetian blind ladder web comprising a chamber having parallel opposed faces and with open ends, means for introducing plastic material into said chamber, a plurality of blocks having opposite parallel faces, means for feeding said blocks through the open ends of said chamber in end to end tandem relation with said opposite parallel faces spaced from said opposed faces of the chamber as moved therethrough for the molding of opposite webs, said blocks having their ends shaped to provide recesses between abutting ends of the blocks for the molding of cross straps extending between said webs when plastic material is forced into said spaces and recesses.

2. A machine as in claim 1 wherein said blocks are continuously circulated through said chamber and said plastic material is continuously fed thereto.

3. A machine as in claim 1 wherein the entrance opening for the blocks at one end of the chamber is a closer fit with said blocks than the exit opening for the blocks at the other end of the chamber whereby the web material extrudes from the chamber with the blocks as they move through the chamber.

4. A machine as in claim 1 wherein the entrance opening for the blocks at one end of the chamber is a closer fit with said blocks than the exit opening at the other end along said opposed faces whereby the web material extrudes from the chamber with the blocks above and below the same as they move through the chamber.

5. A machine as in claim 1 wherein said blocks have lateral flanges through which the blocks are guided and fed through the chamber.

6. A machine as in claim 1 wherein said blocks are in tandem contiguous relation, there being two forms of blocks alternating and with alternate blocks identical.

7. A machine as in claim 1 wherein said blocks are in two forms, and means to circulate the blocks of one form through one orbit and circulate the blocks of the other form through another orbit, said orbits being common through the chamber, and said blocks being in tandem contiguous relation through said common orbits with the blocks of one form alternating with the blocks of the other form.

8. A machine as in claim 1 wherein there are means beyond the chamber to retard the blocks as fed therethrough to insure firm contact of the blocks one with the other in the chamber.

9. The method of forming an article similar to a Venetian blind ladder web comprising extruding a resin material in the form of a pair of webs in generally parallel spaced relation and while so forming the webs simultaneously connecting the webs by flowing material to form cross straps extending from web to web located at intervals along the longitudinal extent of the webs.

HENRY W. HONEYMAN, Jr.
HENRY W. HONEYMAN, 3rd.

REFERENCES CITED

The following references are of record in the file of this patent:

UNITED STATES PATENTS

| Number | Name | Date |
|---|---|---|
| 862,475 | Haywood | Aug. 6, 1907 |
| 2,452,607 | Slaughter | Nov. 2, 1948 |